(12) United States Patent
Latt et al.

(10) Patent No.: US 11,820,452 B2
(45) Date of Patent: Nov. 21, 2023

(54) BICYCLE HANDLEBAR MOUNTED AUTOMOBILE PROXIMITY SENSING, WARNING AND REPORTING DEVICE

(71) Applicant: Arizona Board of Regents on Behalf of the University of Arizona, Tucson, AZ (US)

(72) Inventors: Daniel Latt, Tucson, AZ (US); Rachel J. Sinclair, Tucson, AZ (US); Tyler J. Mills, Tucson, AZ (US); Ricardo Padilla Vera, Tucson, AZ (US); Bridget Slomka, Tucson, AZ (US); Daniel Taylor, Tucson, AZ (US); Gavin S. Mitchell, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 73 days.

(21) Appl. No.: 17/495,018

(22) Filed: Oct. 6, 2021

(65) Prior Publication Data
US 2022/0126942 A1 Apr. 28, 2022

Related U.S. Application Data

(60) Provisional application No. 63/105,701, filed on Oct. 26, 2020.

(51) Int. Cl.
*B62J 6/00* (2020.01)
*B62J 6/22* (2020.01)
(Continued)

(52) U.S. Cl.
CPC . *B62J 6/22* (2020.02); *B62J 6/04* (2013.01); *B62J 45/422* (2020.02); *B62J 50/25* (2020.02); *B62K 21/12* (2013.01)

(58) Field of Classification Search
CPC ....... B62J 6/22; B62J 6/04; B62J 50/25; B62J 45/422
See application file for complete search history.

(56) References Cited

U.S. PATENT DOCUMENTS

| 2015/0228066 A1* | 8/2015 | Farb | H04N 23/50 348/148 |
| 2018/0079463 A1* | 3/2018 | Pearce | B60Q 1/30 |

(Continued)

FOREIGN PATENT DOCUMENTS

KR 2018006144 A * 1/2018 ............. B62J 6/001

*Primary Examiner* — Julie A Bannan
(74) *Attorney, Agent, or Firm* — Stuart H. Mayer (57) ABSTRACT

A bicycle safety enhancement device includes an elongated member having a distal portion mountable to a bicycle handlebar. A proximity sensor is coupled to a proximal portion of the elongated member and is arranged so that when the elongated member is mounted to a handlebar of a bicycle being ridden by a cyclist, the ultrasonic sensor detects objects adjacent to and/or behind the bicycle and which come within a prescribed distance of the bicycle. An illumination source is coupled to the proximal portion of the elongated member. The illumination source provides a visible warning signal directed toward the detected object when the elongated member is mounted to the handlebar of the bicycle. A camera is coupled to the proximal portion of the elongated member and is arranged to capture images of the detected object as the detected object passes in front of the bicycle being ridden by the cyclist.

16 Claims, 6 Drawing Sheets

(51) Int. Cl.
  *B62K 21/12* (2006.01)
  *B62J 6/04* (2020.01)
  *B62J 50/25* (2020.01)
  *B62J 45/422* (2020.01)

(56) References Cited

U.S. PATENT DOCUMENTS

2020/0191952 A1* 6/2020 Makinen ................. G01S 7/003
2020/0346706 A1* 11/2020 Isenschmid ............ G08G 1/166

* cited by examiner

BICYCLE HANDLEBAR MOUNTED AUTOMOBILE PROXIMITY SENSING, WARNING AND REPORTING DEVICE

BACKGROUND

A primary hazard to bicyclists is inattentive motor vehicle drivers. Since bicycles move much more slowly than motor vehicles and are relatively less common on certain roads, bicycles are often unnoticed. A small proportion of motorists do not consistently give cyclists enough space that they can reliably negotiate potholes and balance safely, potentially causing an accident that could injure and/or kill the cyclist. In 2018, 857 cyclists were killed in collisions with vehicles and thousands more were injured. This is a 6% increase from the year before.

To combat this problem some jurisdictions require motorists to maintain a minimum distance from a bicycle when passing. For instance, an Arizona state law mandates that when passing a cyclist a vehicle must provide at least three feet of passing distance until it has completely overtaken the bicycle, but this law is not widely known and is rarely enforced.

SUMMARY

In one aspect, the aforementioned problems may be addressed by providing a bicycle safety enhancement device that can be secured, for instance, to the handlebars of a bicycle. The bicycle safety enhancement device is configured to detect a vehicle approaching a bicycle from behind as the bicycle is being ridden by a cyclist. In response to detecting that the vehicle has come within a prescribed distance of the bicycle, a visible warning signal is projected toward the vehicle to warn a driver of the vehicle that the bicycle is present. Also in response to detecting that the vehicle has come within the prescribed distance of the bicycle, an image of the vehicle is captured as it passes in front of the bicycle being ridden by the cyclist. In this way the rear license plate number of the vehicle can be obtained and the vehicle identified. Similarly, an image of the front license plate number may be captured in addition to or instead of the rear license plate number.

In yet another aspect, a bicycle safety enhancement device is provided. The device includes an elongated member having a distal portion mountable to a bicycle handlebar. A proximity sensor is coupled to a proximal portion of the elongated member and is arranged so that when the elongated member is mounted to the handlebar of a bicycle being ridden by a cyclist, the ultrasonic sensor detects objects (e.g., vehicles) adjacent to and/or behind the bicycle and which come within a prescribed distance of the bicycle. An illumination source is coupled to the proximal portion of the elongated member. The illumination source provides a visible warning signal directed toward the detected object when the elongated member is mounted to the handlebar of the bicycle being ridden by the cyclist. A camera is coupled to the proximal portion of the elongated member and is arranged to capture one or more images of the detected object as the detected object passes in front of the bicycle being ridden by the cyclist.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that aspects of the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DETAILED DESCRIPTION

Figure 1A:
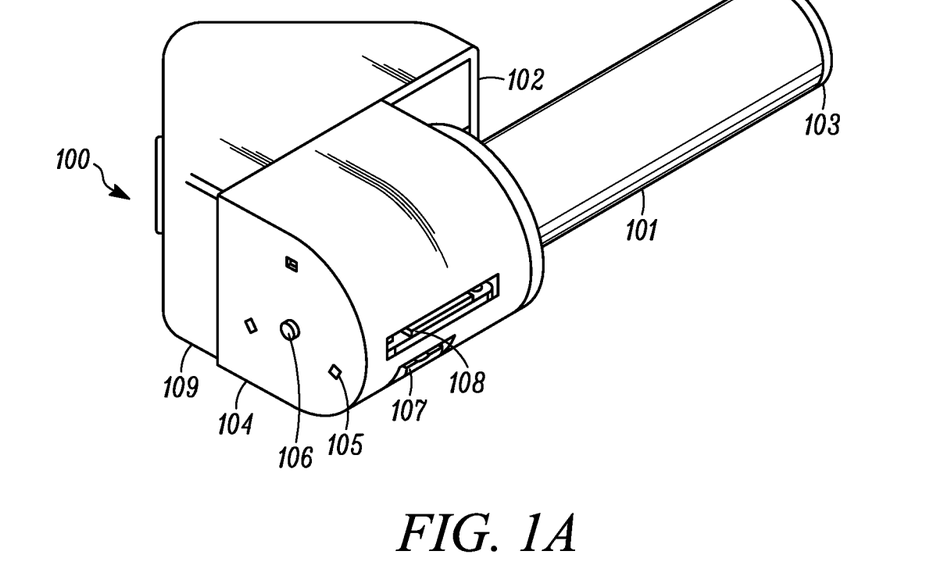
FIG. 1A is a perspective view of one embodiment of a bicycle safety enhancement device.
Figure 2:
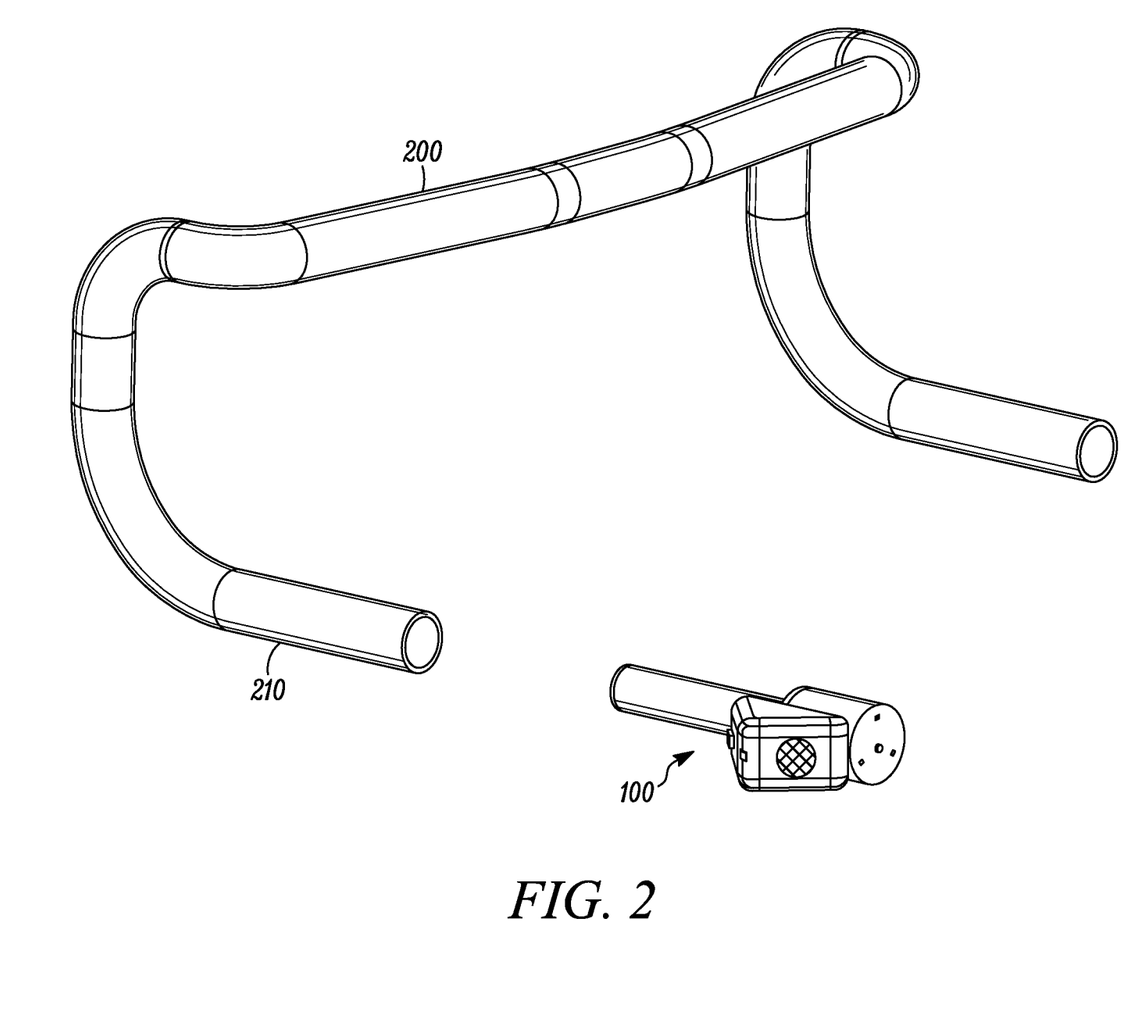
FIG. 2 is a perspective view of the bicycle safety enhancement device of FIG. 1 being inserted into the left handlebar of a bicycle.
Figure 3:
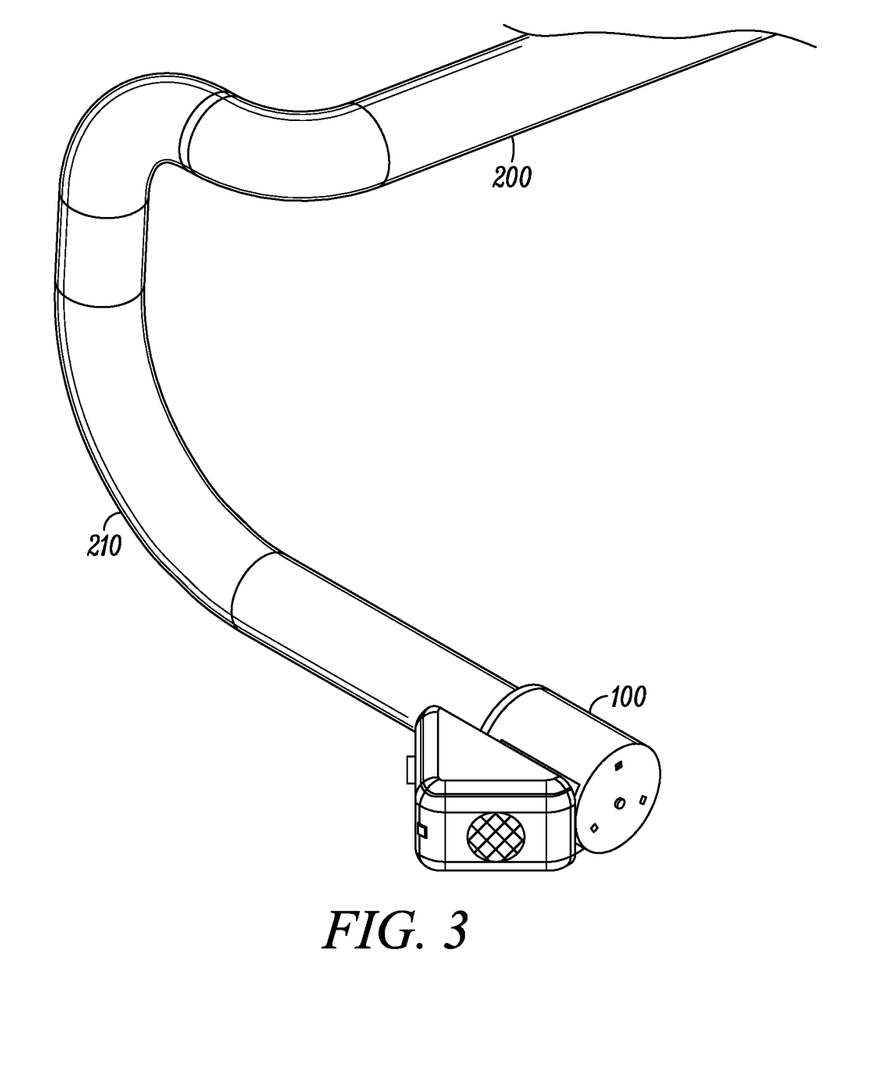
FIG. 3 is a perspective view of the bicycle safety enhancement device of FIG. 1 after its insertion into the left handlebar of a bicycle.

FIG. 1A is a perspective view of one embodiment of a bicycle safety enhancement device that addresses the aforementioned problems. As indicated in FIGS. 2 and 3, the device fits largely within the left handlebar of a standard road bicycle with minimal protrusion to conserve aerodynamics and enhance aesthetic appeal. In FIGS. 1-3 and the figures that follow, like elements are denoted by like reference numerals. The device effectively replaces a left handlebar end cap but adds multiple features. In this particular embodiment four primary features are provided.

First, the device is equipped with illumination sources that continuously flash to indicate the presence of the cyclist to motorists coming from behind. Two, the device includes a proximity sensor for detecting when a vehicle comes within a prescribed distance (e.g., 1, 2, 3, 4, 5, 6, 7, 8, 9, 10, 11, 12, 13, 14, 15, 16, 17, 18, 19, 20 or more feet) of the bicycle, thereby establishing an exclusion zone that is not to be breached. Three, a warning indicator such as a side-facing flashing light is activated when a vehicle is detected by the proximity sensor as breaching the exclusion zone that is to be maintained from the bicycle. Four, a forward-facing camera is provided to capture license plate images of vehicles that have been detected by the proximity sensor as breaching the exclusion zone.

Referring to FIG. 1A in more detail, the bicycle safety enhancement device 100 includes a distal housing 101 that is mounted within the left handlebar tube of the bicycle using a compression fit. The device 100 also includes a proximal housing 104 that connects to the end portion of the distal housing 101 remote from the end portion that is mounted to the bicycle. A side housing 109 is connected to the proximal housing 104.
}

The proximal housing 104 includes an end face from which one or more continuously operating, rear-facing flashing lights serve to indicate the presence of the cyclist to motorists who are coming from behind. In the embodiment of FIG. 1A, two flashing LEDs 105 are employed, although more generally any number of LEDs may be provided. The LEDs 105 may be chosen to flash at a rate that is most likely to alert the user to the presence of the cyclist. For example, in some embodiments the LEDs 105 may flash at a rate of 4-8 Hz, which has been found to be the rate that attracts the most attention to the human eye while also minimizing power consumption.

The end face of the proximal housing 104 may also include other indicators. For instance, an indicator may be provided that warns the cyclist if a vehicle is approaching from behind (as determined using the proximity sensor 112, described below). In some cases the indicator may be implemented using one or more LEDs that changes color when the vehicle is approaching. The LED or LEDs that are used for this purpose may be the LEDs 105 or alternative LEDs that are provided.

The end face also includes a power button 106 for powering the device on and off. The proximal housing 104 also includes a communication and power charging interface such as a micro USB port 107, for example. An interface 108 is also provided for a removable data storage medium (e.g., an SD card reader) on which the license plate images captured by the camera are stored. In some embodiments the proximal housing 104 also contains the microprocessor and associated electronics to ensure proper operation of the bicycle safety enhancement device. While in some cases the battery or other power source for the device also may be located in the proximal housing 104, in other embodiments it may be more conveniently located in the distal housing 101.

Figure 1B:
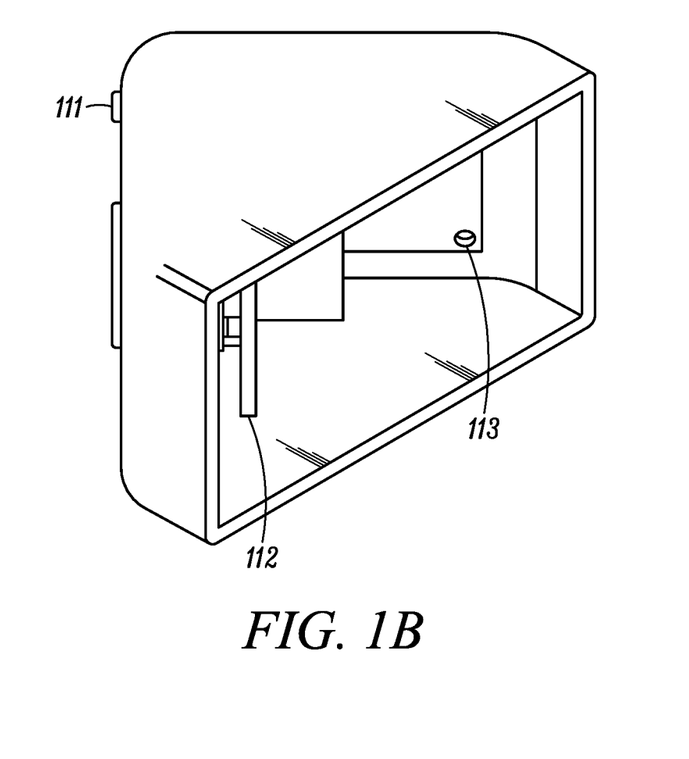
FIG. 1B shows the side-housing of the bicycle safety enhancement device in more detail.
Figure 4:
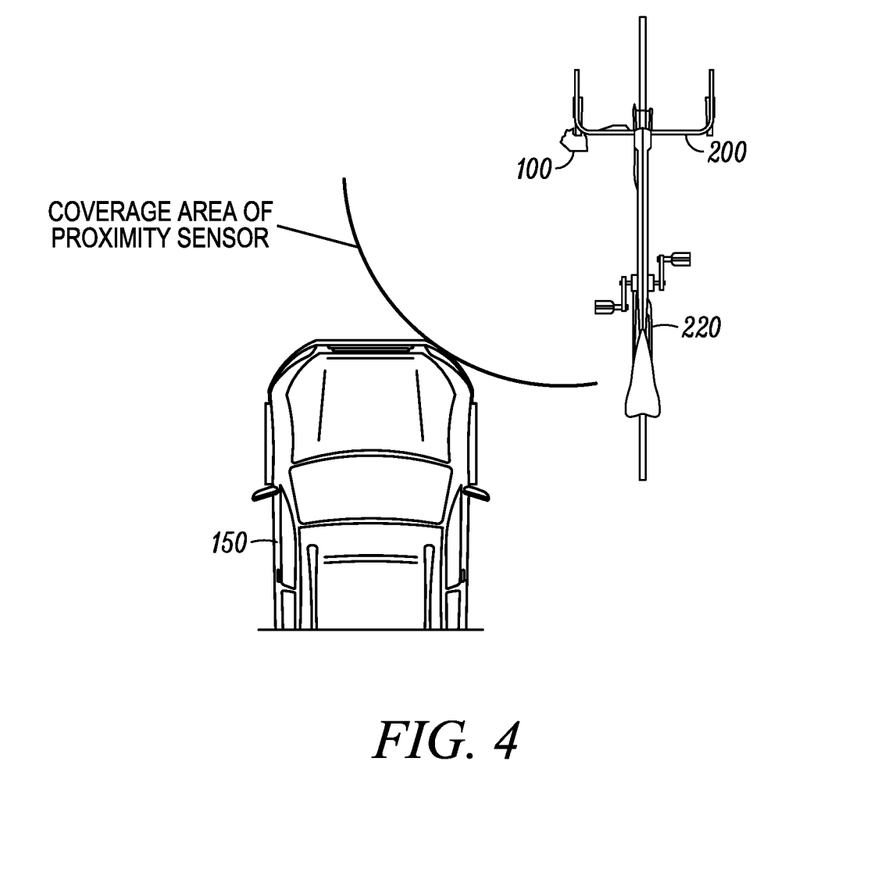
FIG. 4 shows an approaching vehicle being detected by a proximity sensor incorporated in the bicycle safety enhancement device.

Referring to FIGS. 1A and 1B, the side-housing 109, which extends outwardly on the side of the proximal housing 104 opposite the side facing the cyclist, includes a proximity sensor 112 that detects when a vehicle approaches the bicycle within the prescribed distance. The proximity sensor 112 is oriented off-axis (relative to a longitudinal axis extending front-to-back along the bicycle) so it can detect vehicles as they approach from behind and on the left periphery of the bicycle. This is illustrated in FIG. 4, which shows the coverage area of the proximity sensor 112 in one implementation. FIG. 4 shows the front of a vehicle 150 about to breach the exclusion zone established by the proximity sensor. In some embodiments the proximity sensor may be an ultrasonic sensor. In other embodiments it may be a Lidar system.

Figure 5:
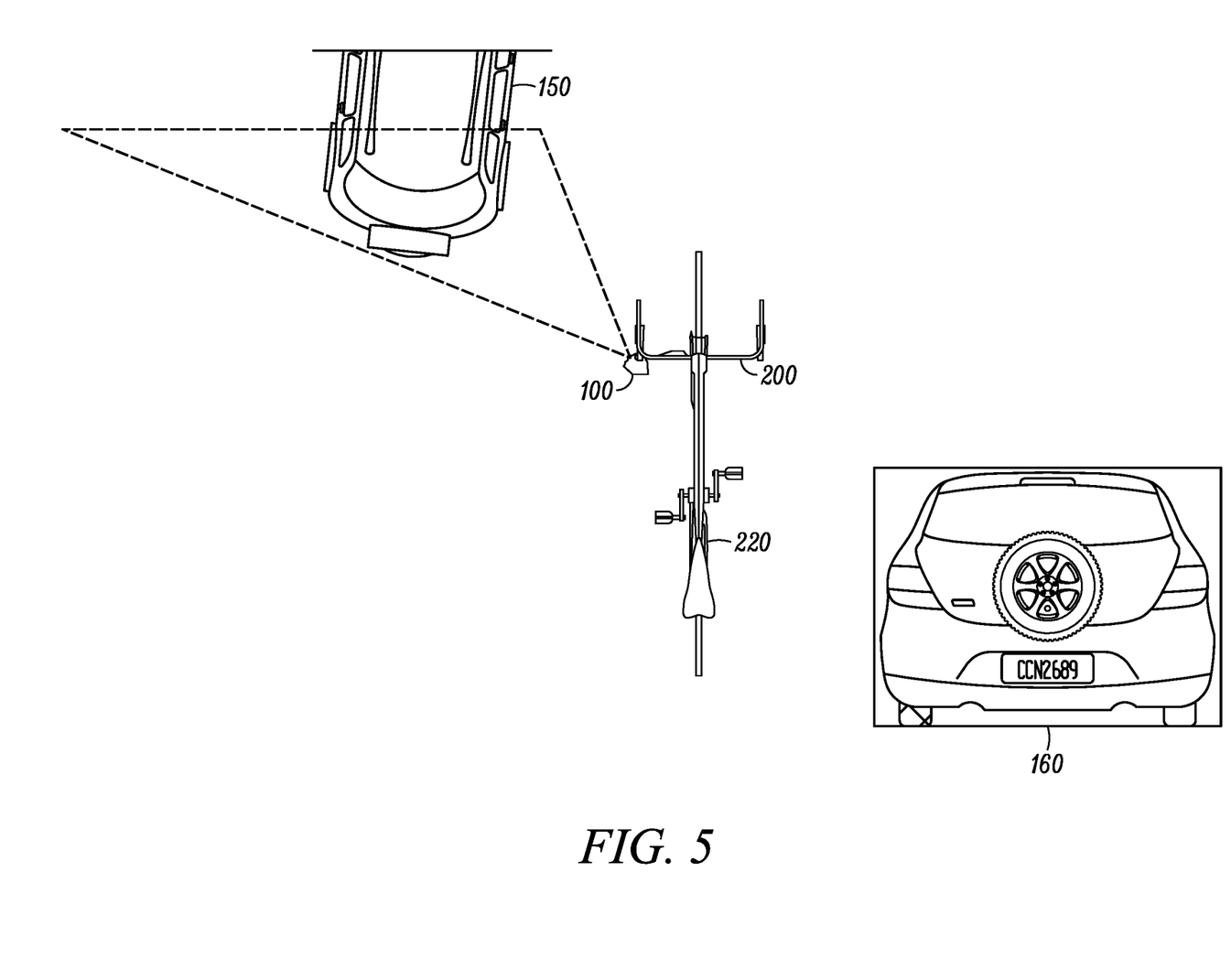
FIG. 5 shows an image of a passing vehicle's license plate being captured by a front-facing camera incorporated in the bicycle safety enhancement device.

The side-housing 109 also includes a front-facing camera 113 that is oriented off-axis (relative to the longitudinal axis extending front-to-back along the bicycle) so that it is facing the road when in use. In this way the camera 113 captures one or more images of the vehicle detected by the proximity sensor 112 as the vehicle passes the bicycle on its left side. This is illustrated in FIG. 5, which shows the area of coverage captured by the camera as a vehicle 150 passes. Also shown is an example of a captured license plate image 160. In some cases the camera 113 may take a sequence or burst of images to ensure that the license plate is captured for vehicles traveling at various speeds and distances from the bicycle. For instance, in one embodiment the camera takes a picture every 50 msec for 4.5 seconds. The camera should have a sufficient pixel size to provide legible images of the license plate characters up to a desired maximum operating distance (e.g., 14 feet). In some embodiments a camera with a pixel size of 2-5 megapixels may be employed to satisfy this requirement. The images can be saved to the removable data storage medium and can be sent to law enforcement to increase driver awareness. In some embodiments, instead of or in addition to locally storing the images, the images may be automatically uploaded to a reporting website or the like over a wireless (e.g., cellular) communication channel.

The side-facing housing 109 also includes a side-facing flashing light such as a flashing LED 111 warning the driver of the vehicle that he or she is intruding too closely upon the bicycle when they breach the exclusion zone being monitored by the proximity sensor. The LED 111 will continue to flash as the vehicle passes the bicycle to increase the likelihood that it will be observed by the motorist.

The bicycle safety enhancement device 100 described above operates under the control of a microprocessor so that once activated, and without the need for user intervention, when the proximity sensor senses disturbances within e.g., three feet, the side warning LED flashes and the camera captures images that are saved to the removable data storage medium, e.g., a micro SD card. The microprocessor may be located, for example, in the proximal housing 104 or the side housing 109.

The various internal components of the bicycle safety enhancement device such as the LEDs, proximity sensor, camera and the microprocessor, which are located within the various assembly housings, may be internally mounted in a manner that reduces or eliminates rattling or their dislodgement, which could lead to both damage and failure to operate. Accordingly, in some implementations the internal walls of the housings may contain small ledges, slots or like in which the internal components are located, each of which is configured to secure the components in a press-fit manner. In some cases the components may be further secured in place to the ledges or slots using a non-conductive adhesive. To further reduce the possibility of rattling or dislodgement, in some embodiments foam may be inserting within the housings. Moreover, in some cases the foam may be provided in thin layers that alternate with adhesive to provide a cushion to further secure the components in place. In another implementation the internal components may be secured using, for instance, brackets and fasteners such as appropriately sized screws.

Alternative embodiments of the bicycle safety enhancement device described herein may incorporate additional features and functions. For instance, in some embodiments the bicycle safety enhancement device may incorporate a communication module that is able to establish direct communication with a telematics unit, navigational unit or other system, in nearby vehicles to provide them with information about the bicycle (e.g., bicycle size, speed, direction of travel) that can help the vehicle avoid collision.

In yet other embodiments the bicycle safety device may incorporate a laser that is able to project a visible line on the road to identify the boundary of the exclusion zone that is not to be breached by vehicles. In this way the motorist will have a visible indicator of the distance to be maintained when passing. Additionally, some embodiments may incorporate a rear facing camera to capture an image of the driver for potential identification purposes. Other embodiments may include a predictive sensing arrangement to be able to anticipate when a vehicle is likely to breach the exclusion zone. For instance, the predictive sensing arrangement may sense oncoming vehicles at multiple points in time and may use this information to determine the positions and velocities of the vehicles to thereby predict their approach leading to a potential breach of the exclusion zone. The predictive sensing arrangement may be implemented using a velocity and trajectory algorithm that is implemented in the microprocessor. The microprocessor may also include a computer vision algorithm to distinguish between an approaching motorized vehicle such as a car or truck and another bicycle.

While the bicycle safety enhancement device shown herein is illustrated as being mountable to a drop bar type handlebar, other embodiments may be configured to be mounted to different handlebar types including, without limitation, straight bars, riser bars, bullhorns, aero bars, cruiser bars, butterfly bars, and so on. In some cases the device may have a multi-adapter or universal adapter arrangement that can be mounted to two or more different types of handlebars. In addition, while the embodiments of the bicycle safety enhancement device described above include three distinct housings in which the components are located, in other embodiments the device may be incorporated in a single integrally formed unit having any appropriate size and shape.

Figure 6:
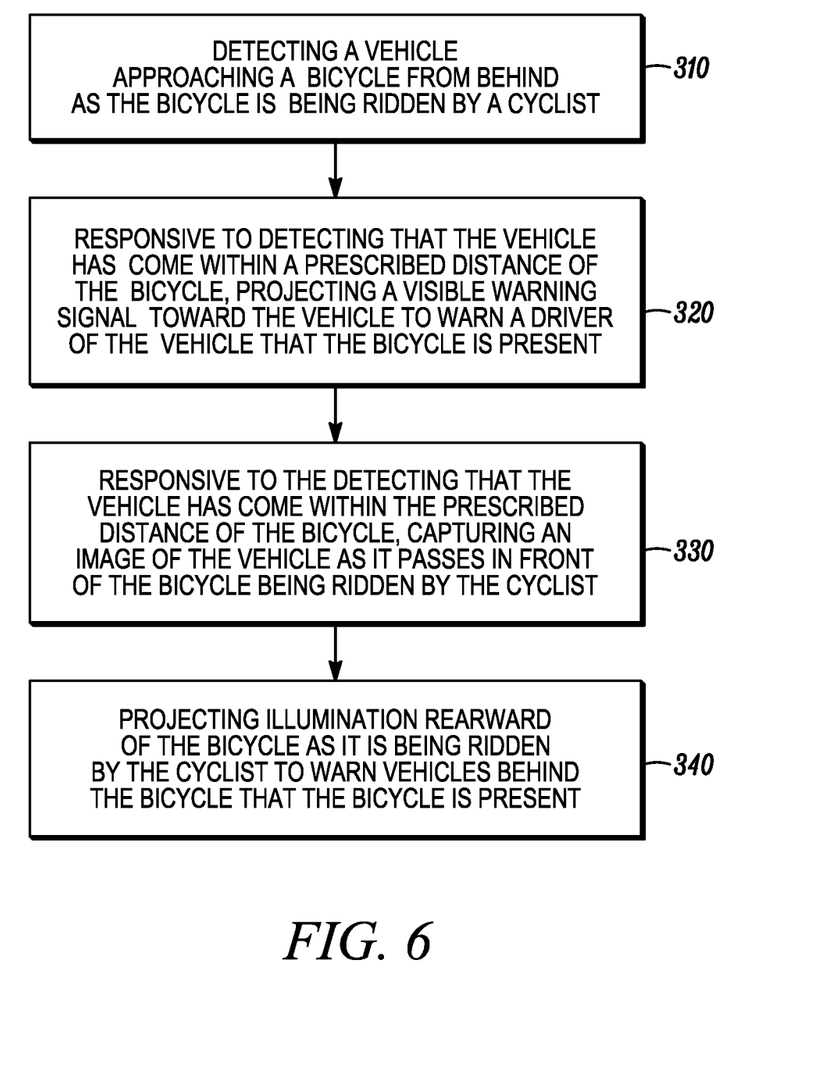
FIG. 6 is a flowchart illustrating one example of a method for enhancing the safety of a cyclist.

FIG. 6 is a flowchart illustrating one example of a method for enhancing the safety of a cyclist. The method includes, at block 310, detecting a vehicle approaching a bicycle from behind as the bicycle is being ridden by a cyclist. Responsive to detecting that the vehicle has come within a prescribed distance of the bicycle, at block 320 a visible warning signal is projected toward the vehicle to warn a driver of the vehicle that the bicycle is present. Likewise, and also responsive to detecting that the vehicle has come within the prescribed distance of the bicycle, an image of the vehicle is captured at block 330 as it passes in front of the bicycle being ridden by the cyclist. The image that is captured may be an image of vehicle's rear license plate. Blocks 320 and 330 may be performed simultaneously or sequentially, with either being performed first. Illumination may also be projected rearward of the bicycle at block 340 as it is being ridden by the cyclist to warn vehicles behind the bicycle that the bicycle is present. In some cases the illumination may be continually projected before, during and after the detecting, projecting and capturing are performed.

The foregoing description is intended to illustrate but not to limit the scope of the invention, which is defined by the scope of the appended claims. Other embodiments are within the scope of the following claims.

The invention claimed is:

1. A bicycle safety enhancement device, comprising:
   an elongated member having a distal portion mountable to a bicycle handlebar;
   a proximity sensor coupled to a proximal portion of the elongated member and being arranged so that when the elongated member is mounted to a handlebar of a bicycle being ridden by a cyclist, the proximity sensor detects objects adjacent to and/or behind the bicycle and which come within a prescribed distance of the bicycle;
   an illumination source coupled to the proximal portion of the elongated member, the illumination source providing a visible warning signal directed toward the detected object when the elongated member is mounted to the handlebar of the bicycle being ridden by the cyclist; and
   a camera coupled to the proximal portion of the elongated member and being arranged to capture one or more images of the detected object as the detected object passes in front of the bicycle being ridden by the cyclist;
   a plurality of additional illumination sources coupled to the proximal portion of the elongated member, the additional illumination sources being arranged to provide illumination toward objects behind the bicycle being ridden by the cyclist to thereby announce the presence of the bicycle;
   at least one housing containing the proximity sensor, the illumination source and the camera, the at least one housing being connected to the proximal portion of the elongated member; and
   wherein the at least one housing includes first and second housings, the first housing being connected to the elongated member and having an end face on which the additional illumination sources are located, the second housing being connected to the first housing and containing the camera, the proximity sensor and the illumination source.

2. The bicycle safety enhancement device of claim 1, wherein the distal portion of the elongated member is configured to be insertable through an opening in a tubular gripping member of the handlebar.

3. The bicycle safety enhancement device of claim 1, further comprising a microprocessor operatively coupled to the proximity sensor, the illumination source and the camera, the microprocessor being configured so that in response to detection by the proximity sensor that an object has come within the prescribed distance of the bicycle, the microprocessor causes activation of the illumination source and causes the camera to capture the one or more images of the detected object.

4. The bicycle safety enhancement device of claim 1 further comprising a removable storage medium on which the images captured by the camera are recorded.

5. The bicycle safety enhancement device of claim 1 wherein the elongated member has a power supply therein for powering the proximity sensor, the illumination source and the camera.

6. The bicycle safety enhancement device of claim 1 wherein the proximity sensor is an ultrasonic sensor.

7. The bicycle safety enhancement device of claim 1 wherein the illumination source includes a flashing LED.

8. A method for enhancing cyclist safety, comprising:
   detecting a vehicle approaching a bicycle from behind as the bicycle is being ridden by a cyclist;
   responsive to detecting that the vehicle has come within a prescribed distance of the bicycle, projecting a visible warning signal toward the vehicle to warn a driver of the vehicle that the bicycle is present; and
   responsive to the detecting that the vehicle has come within the prescribed distance of the bicycle, capturing an image of the vehicle as it passes in front of the bicycle being ridden by the cyclist.

9. The method of claim 1, wherein capturing the image of the vehicle includes capturing an image of a front and/or rear license plate of the vehicle.

10. The method of claim 9, further comprising capturing an image of a driver of the vehicle.

11. The method of claim 8, wherein the detecting, projecting and capturing are performed by a bicycle safety enhancement device associated with the bicycle.

12. The method of claim 11, wherein the bicycle safety enhancement device is secured to a handlebar of the vehicle.

13. The method of claim 8, further comprising projecting illumination rearward of the bicycle as it is being ridden by the cyclist to warn vehicles behind the bicycle that the bicycle is present.

14. The method of claim 8, further comprising distinguishing between an approaching motorized vehicle and another bicycle when detecting the vehicle approaching the bicycle.

15. The method of claim 8, further comprising projecting a visible line on a road on which the bicycle is being ridden that indicates when the vehicle has come within the prescribed distance of the bicycle.

16. The method of claim 8, further comprising, based on a determination of a detected trajectory and velocity of the vehicle, predicting that the vehicle will come within the prescribed distance of the bicycle and initiating projection of the visible warning signal in response thereto.

* * * * *